United States Patent
Ehrfeld et al.

(10) Patent No.: US 6,982,064 B1
(45) Date of Patent: Jan. 3, 2006

(54) MICROMIXER

(75) Inventors: Wolfgang Ehrfeld, Mainz (DE); Frank Michel, Bad Hergentheim (DE); Astrid Lohf, Mainz (DE); Volker Graeff, Mainz (DE)

(73) Assignee: Institut fur Mikrotechnik Mainz GmbH, Mainz (DE)

( * ) Notice: Subject to any disclaimer, the term of this patent is extended or adjusted under 35 U.S.C. 154(b) by 598 days.

(21) Appl. No.: 10/018,198

(22) PCT Filed: Jun. 10, 2000

(86) PCT No.: PCT/EP00/05366

§ 371 (c)(1),
(2), (4) Date: Apr. 23, 2002

(87) PCT Pub. No.: WO00/76648

PCT Pub. Date: Dec. 21, 2000

(30) Foreign Application Priority Data

Jun. 16, 1999 (DE) .............................. 199 27 544

(51) Int. Cl.
*G01N 33/48* (2006.01)
*B01F 15/00* (2006.01)
*B01F 5/06* (2006.01)

(52) U.S. Cl. .................... 422/130; 366/340; 366/341; 138/37; 422/101

(58) Field of Classification Search ............... 422/130, 422/101; 436/37; 366/336, 340, 341; 138/37
See application file for complete search history.

(56) References Cited

U.S. PATENT DOCUMENTS

| | | | | |
|---|---|---|---|---|
| 4,062,524 A | * | 12/1977 | Brauner et al. | 366/340 |
| 5,595,712 A | | 1/1997 | Harbster et al. | |
| 6,159,442 A | * | 12/2000 | Thumm et al. | 423/659 |
| 6,458,325 B1 | * | 10/2002 | Roscher et al. | 422/68.1 |
| 6,749,814 B1 | * | 6/2004 | Bergh et al. | 422/130 |
| 2003/0175947 A1 | * | 9/2003 | Liu et al. | 435/288.5 |
| 2004/0092033 A1 | * | 5/2004 | Gustafson et al. | 436/180 |

FOREIGN PATENT DOCUMENTS

| | | |
|---|---|---|
| EP | 0 495 169 | 7/1992 |
| EP | 0 870 541 | 10/1998 |
| WO | WO 94/21372 | 9/1994 |
| WO | WO 01/43857 | * 6/2001 |

\* cited by examiner

*Primary Examiner*—N. Bhat
(74) *Attorney, Agent, or Firm*—Hudak, Shunk & Farine Co. LPA

(57) ABSTRACT

Known static micromixers that work according to the principle of multilamination allow for a rapid mixing by diffusion. The invention provides a means for substantially increasing the throughput of known micromixers. To this end, the inventive micromixer for mixing two or more reactants comprises microstructures that define mixer cells. Each of said mixer cells is provided with a feeding chamber which adjoins at least two groups of digital channels. Said channels intermesh with the digital channels of the groups adjoining the feeding channels in a comb-like manner, thereby producing mixing zones]. Outlet ports are located above said mixing zones, said outlet ports extending perpendicularly to the digital channels and discharging the product. The inventive micromixer is especially useful for the large-scale production of mixtures, dispersions and emulsions.

17 Claims, 13 Drawing Sheets

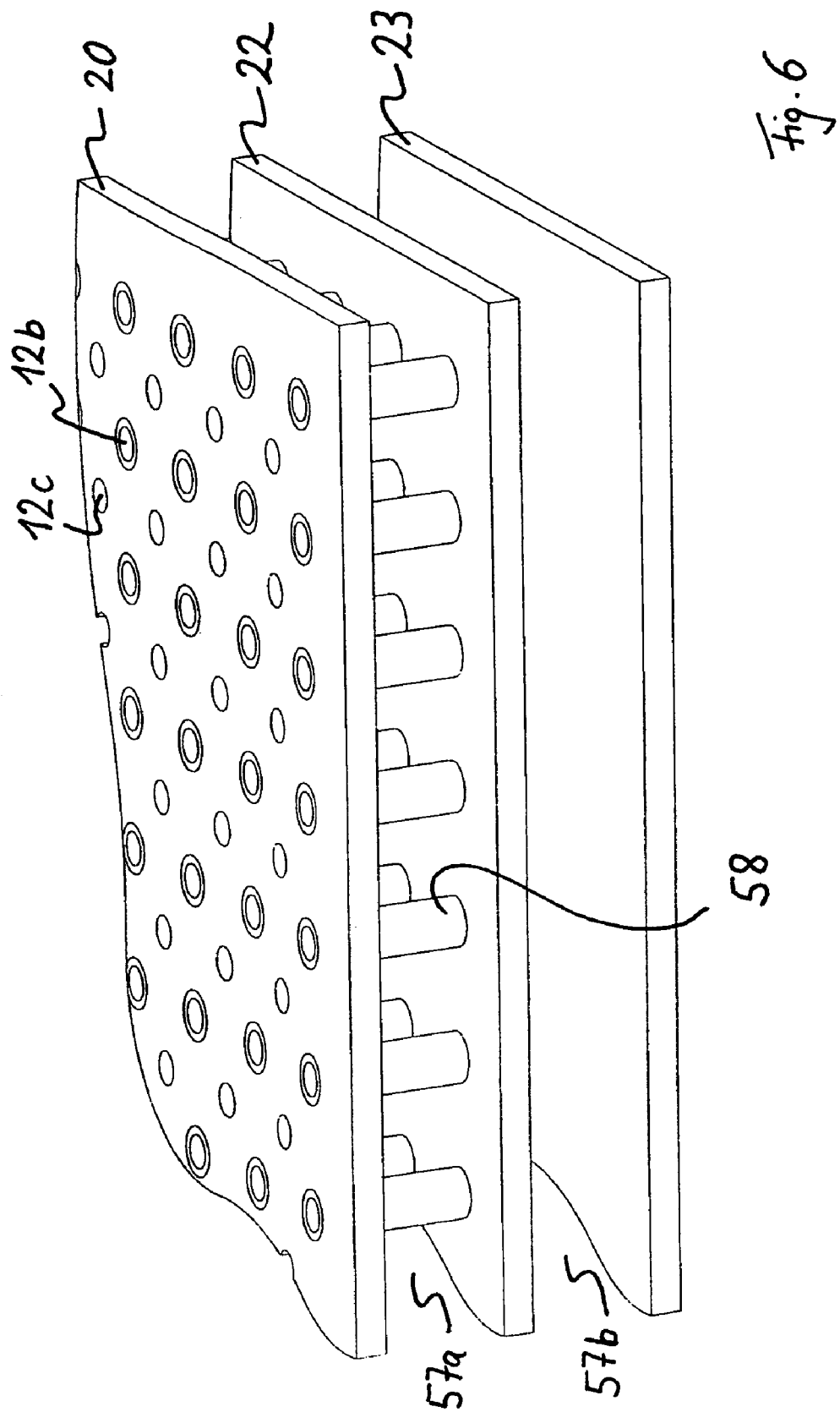

MICROMIXER

FIELD OF THE INVENTION

The invention relates to a micromixer for mixing at least two reactants having penetrations for the supply of the reactants and discharge of the product, having at least one mixing plate with microstructures that define mixer cells, each of said mixer cells having a feeding chamber which adjoins at least one group of digital channels which intermesh in a comb-like manner with the digital channels of a group from the adjoining feeding chamber; and having a discharge plate arranged on the mixing plate, said discharge plate having an outlet port above each mixing zone, said outlet port extending perpendicularly to the digital channels.

BACKGROUND OF THE INVENTION

Although microfluid components were developed years ago for analytical applications, microengineering techniques have only recently been applied to the development of equipment for chemical synthesis, so-called microreactors. Principle components of such microreactors are mixers and heat exchangers. Conventional static micromixers work according to the principle of multilamination to ensure rapid mixing by diffusion. This is the only mixing mechanism that can be used with laminar flows in microchannels. The creation of alternating laminations by means of geometric parameters allows good mixing in the microscopic range.

The publication Int. Eng. Chem. Res. 1999, 38, 1075–1082, W. Ehrfeld et al., describes a generic micromixer. This single mixer comprises three components: a galvanically and X-ray lithographically structured plate having a mixing zone and two feeding chambers and a two-piece casing in which the plate is set. A means for the supply of reactant and the discharge of the product are provided in the upper section of the casing.

The single mixer has two mixer cells with a common mixing zone. The two fluid reactants are fed into the mixing chambers and split into partial flows in the digital channels. The partial flows of one reactant are not in contact with the partial flows of the other reactant—they are separated from one another by microwalls in the form of ribs. The two reactants first come in contact with one another in the port zone, which is above and perpendicular to the digital channels. The product is discharged from the casing through the ports. The pressure drop in the mixing zone is set by means of the port width.

A significant disadvantage of this single mixer is that its throughput is very limited. With a pressure drop of approx. 1.2 bar, throughput is only 0.8 l/h. Because of this low throughput, use of the single mixer for large-scale chemical production is limited. In an attempt to alleviate this problem, 10 single mixers were arranged in parallel in one casing, with the reactants supplied to the individual micromixers from a common source. The single mixers were arranged in a star configuration, with the supply line for one reactant in the center of the star and the supply lines for the other reactant running around the outside of the star (at the indicated locations). But this measure only resulted in increasing throughput from 0.8 l/h to approx. 3 l/h with a pressure drop of approx. 1.2 bar.

SUMMARY OF THE INVENTION

The object of the current invention is to provide a micromixer utilizing the same mixing principle as conventional micromixers but permitting significantly greater throughput at the same pressure drop.

This object is achieved by means of a micromixer for mixing two reactants having openings for the supply of the reactants and/or discharge of the product; microstructures that define at least one mixing plate with mixer cells, whereby each mixer cell has a feeding chamber which adjoins at least one group of digital channels, which digital channels intermesh comb-like with the digital channels of a group from the adjoining feeding chambers; and a discharge plate arranged on the first plate, said discharge plate having an outlet port above each mixing zone, said outlet port extending perpendicularly to the digital channels, characterized by the fact that each mixer cell has at least two mixing zones.

In the inventive micromixer, the number of microstructures per surface area and thus the throughput is greatly increased. With the inventive micromixer, throughputs of several hundred l/h are achieved with a pressure drop of approx. 1.2 bar. This is many times greater than the throughput of the single mixer and single mixers connected in parallel. The plates of the micromixer can be manufactured of silicon wafers that are structured by means of deep plasma etching and connected to one another by means of anodic bonding, for example. The plates can be also be produced by structuring resist, e.g. lithographically or using a laser, with subsequent galvanic shaping. This is particularly well-suited for producing microstructures with large aspect ratios.

The reactants to be mixed in the micromixer can be any combination of gases, fluids, solutions or mixtures thereof. The micromixer is particularly well-suited for the manufacture of mixtures of two fluids or solutions, of fluid—fluid emulsions or gas-fluid dispersions.

The width of the individual digital channels is preferably between 5 and 150 $\mu$m and the height of the walls defining the digital channels is preferably between 50 $\mu$m and 2 mm. A group of digital channels comprises preferably 3 or more channels. Because of the required pressure drop, the width of the outlet ports is preferably between 10 $\mu$m to 1 mm and lesser than the height of the walls defining the digital channels. For complete mixing of the reactants, the width of the outlet ports in the discharge plate must be less than the overlap of the adjoining digital channels in the mixing zone.

There are two preferred embodiments of the inventive micromixer. Similar to the single mixer, the one embodiment has two feeding chambers, each of which has parallel main channels that intermesh in a comb-like manner, however. Branching off of each main channel are digital channels which likewise intermesh in a comb-like manner and form the mixing zones. This configuration increases both the number of mixing zones per mixer cell and the ratio of the surface area of the mixing zones relative to the total surface area of the mixer cell, and thus the throughput per surface are. The corresponding discharge plate has a multitude of parallel ports whose number is equal to the number of mixing zones.

Each feeding chamber preferably has two or more, and more preferably four or more main channels. The digital channels preferably branch off of both sides over the length of the main channels.

This micromixer makes it possible to integrate two or more such mixers into a micromixer system. This is done by arranging one micromixer over the other and configuring the ports for feeding the reactants and discharging the products such that the product of the one micromixer is fed to the other micromixer as the second reactant. This makes it possible to produce products whose reactions occur in two or more stages.

In the aforementioned variant, the micromixers are fluidically connected in serial, i.e. the product of one micromixer is fed to the next micromixer as one of the reactants.

In another embodiment, the micromixers are fluidically connected in parallel, i.e. all micromixers are supplied with the same reactant and the products are discharged together.

Both variants can be advantageously realized by stacking mixing plates and possibly additional supply and/or distribution plates.

In the second preferred embodiment of the inventive micromixer, mixing zones are arranged on all sides of the feeding chambers in the plane of the plates. Only those feeding chambers at the edge of the plane of the plates have mixing zones on only one or two sides. This increases the ratio of mixing zone area to mixer cell area and thus increases the throughput per surface area. The object of the invention is to arrange as many mixer cells as possible on the mixing plate. It is advantageous for the mixing plate to have 10 or more mixer cells per square centimeter.

It is advantageous if the feeding chambers are arranged according to the reactants in rows and/or columns in an alternating pattern. This further reduces the percentage of unutilized surface area. It is particularly advantageous if the feeding chambers are arranged in 4 or more rows and in 4 or more columns.

An optimal utilization of the surface area is achieved if the feeding chambers have either a rectangular or triangular outline, with squares or equilateral triangles preferred. The ports of the corresponding discharge plates are located along the edges of the squares or equilateral triangles, which are arranged so as to completely cover the discharge plate.

Two approaches have proven to be advantageous for the supply of reactants to the mixing plate. The first approach is to structure that side of the mixing plate facing away from the mixer cells. This creates a storage chamber for each reactant. Parallel channels lead out from each storage chamber and run beneath the feeding chambers. It is important that the channels for the two reactants intermesh in a comb-like manner so that the feeding chambers with one reactant are surrounded by the feeding chambers with the other reactant. Each channel has penetrations beneath the feeding chambers, which penetrations lead into the feeding chambers and through which the reactant can flow into the feeding chambers. It is not mandatory that the mixing plate be a monobody construction, one plate can be manufactured with the microstructures and another plate can have the feed structures, with both plates joined by means of anodic bonding, for example, to form a mixing plate.

The other approach for supplying the reactants to the mixing plate is to arrange two additional plates beneath the mixing plate. The one plate together with the mixing plate form a storage chamber for the one reactant and the other plate together with the first plate forms a storage chamber for the second reactant. The reactant in the storage chamber adjoining the mixing plate passed directly into the corresponding feeding chambers via penetrations in the mixing plate. The first additional plate is provided with penetrations for the supply of the other reactant, through which penetrations hollow bodies that also pass through penetrations in the mixing plate and empty into the corresponding feeding chambers are run. The second reactant flows from the second storage chamber into the feeding chambers through these hollow bodies. The flow resistance in these feeding chambers is particularly low so that the reactants are very evenly distributed between the individual feeding chambers. However, this requires more space than does the supply via structures in the back side of the mixing plate.

Of particular importance for the use of the micromixer as a microreactor is the integration of a heat exchanger in the micromixer, if necessary. The heat exchanger can be integrated into the micromixer in a variety of ways. The following solutions are preferred: for reactions or mixtures with little heat tone, it is sufficient to arrange hollow bodies on the discharge plate between the ports, through which hollow bodies a heating medium or coolant flows.

With greater heat tone, the discharge plate can be a two-piece construction in which two overlapping cover plates are arranged at some distance from one another to form a chamber that is filled with either a heating medium or coolant. To pass the product through the heating medium or coolant, flattened hollow bodies analogous to those in the example described above for the supply of reactant and having an outline corresponding to that of the ports are arranged in the ports of both parts of the discharge plate. This variant provides a particularly homogenous distribution of heat. In another embodiment, the discharge plate can be designed with sufficient thickness to include channels perpendicular to the ports, through which channels the heating medium or coolant can flow.

Under certain circumstances, it may be necessary to bring the reactants to a certain temperature. In these cases, it is advantageous to use a micromixer in which the reactants are supplied through storage chambers formed by two plates. To attemporate the reactants, an additional plate is inserted between the first plate and the mixing plate so that another storage chamber is formed between the mixing plate and this additional plate. The heating medium or coolant is fed into this storage chamber. Both reactants must be passed through the heat exchanger chamber in hollow bodies, e.g. tubes. The hollow bodies must be secured in the plates so as to obtain a tight seal. These can be welded, soldered/brazed, diffusion welded, pressed in or bent on.

BRIEF DESCRIPTION OF THE DRAWINGS

FIG. 6 a second embodiment of the reactant supply

DETAILED DESCRIPTION OF THE INVENTION

Figure 1A:
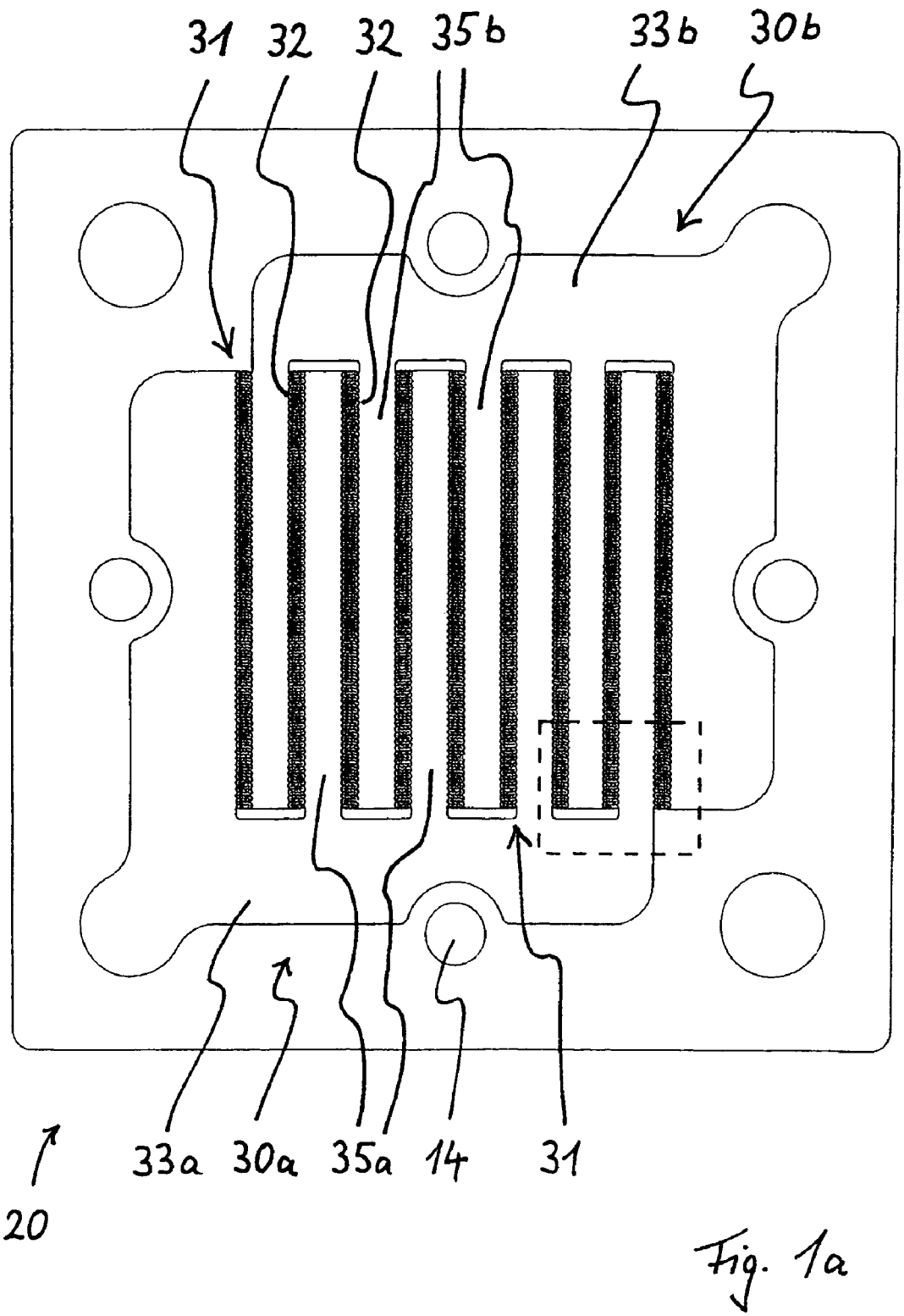
FIG. 1*a* a first embodiment of a mixing plate

FIG. 1a shows a first embodiment of a mixing plate 20. This mixing plate 20 has two feeding chambers 33a and 33b for the reactants A,B. Both feeding chambers 33a,b branch into four primary channels 35a,b. Microstructures 31 defining the mixing zones 32 between the main channels 35 for the reactants A and B are located on both sides along the main channels 35a,b. The main channels 35a,b intermesh in a comb-like manner. The feeding chambers 33a,b together with the mixing zones 32 each form a mixer cell 30a and 30b.

The mixing plate 20 also has recesses 14 by means of which the individual plates comprising the micromixer are screwed together.

Figure 1B:
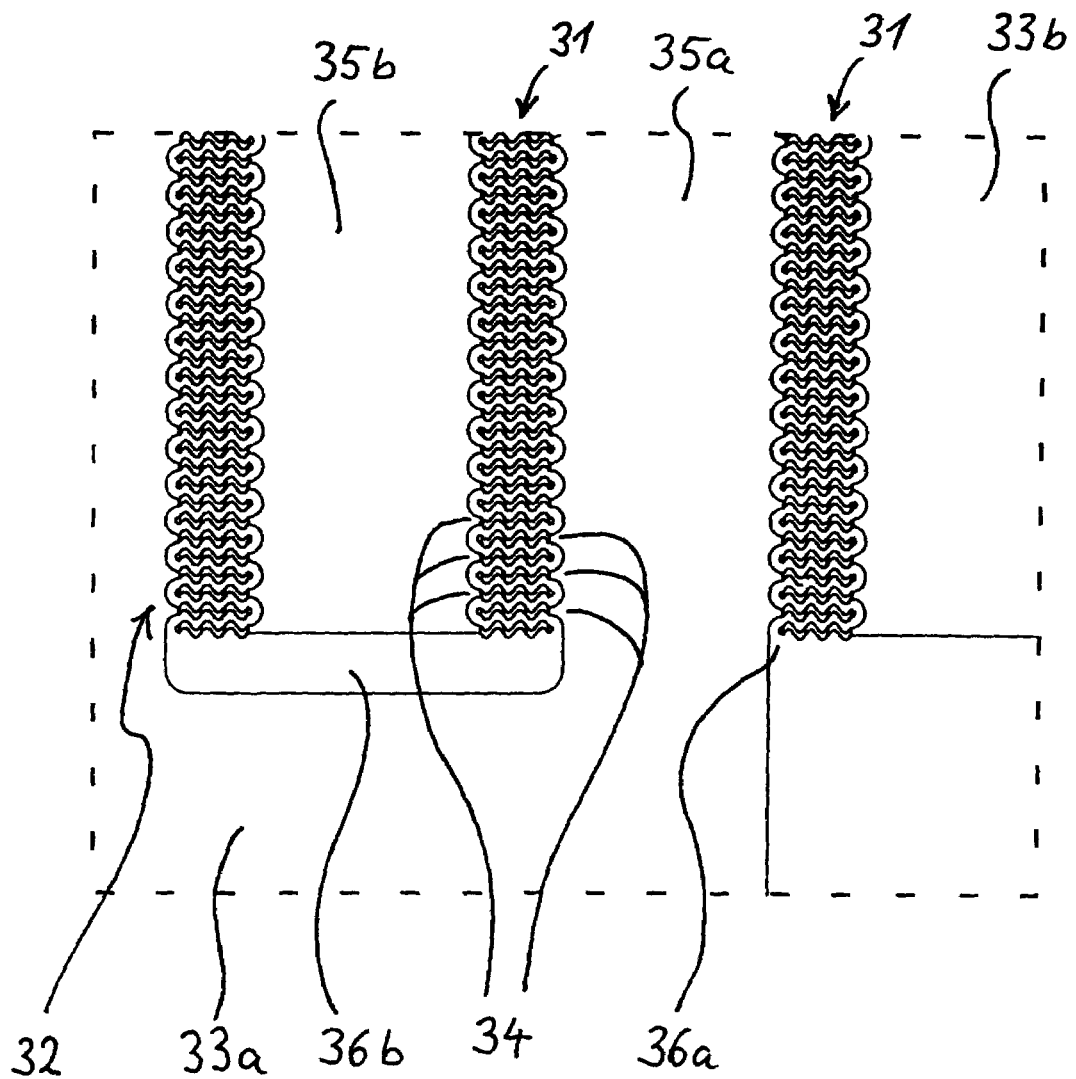
FIG. 1*b* a section from the mixing plate in FIG. 1*a*

FIG. 1b is an enlarged view of that section of FIG. 1a marked with a broken line. One can see that digital channels 34 branch off from the main channels 35a,b. These digital channels are separated from one another by microstructures in the form of thin walls 36a. These walls 36a are corrugated and meandering to increase their mechanical stability. This is necessary as these walls 36a and also the digital channels 34 are only approximately 40 μm wide. In contrast, the digital channels 34 are approximately 300 μm long. One also can see that wider walls 36b separate the main channels 35a,b and also the feeding chambers 33a,b from one another. The reactants A and B first come into contact with one another as they pass through a port in a discharge plate 21 (cf. FIG. 1c) arranged above and extending perpendicularly to the digital channels 34 and over the entire mixing zone 32. The port is approximately 80 μm wide.

Figure 1C:
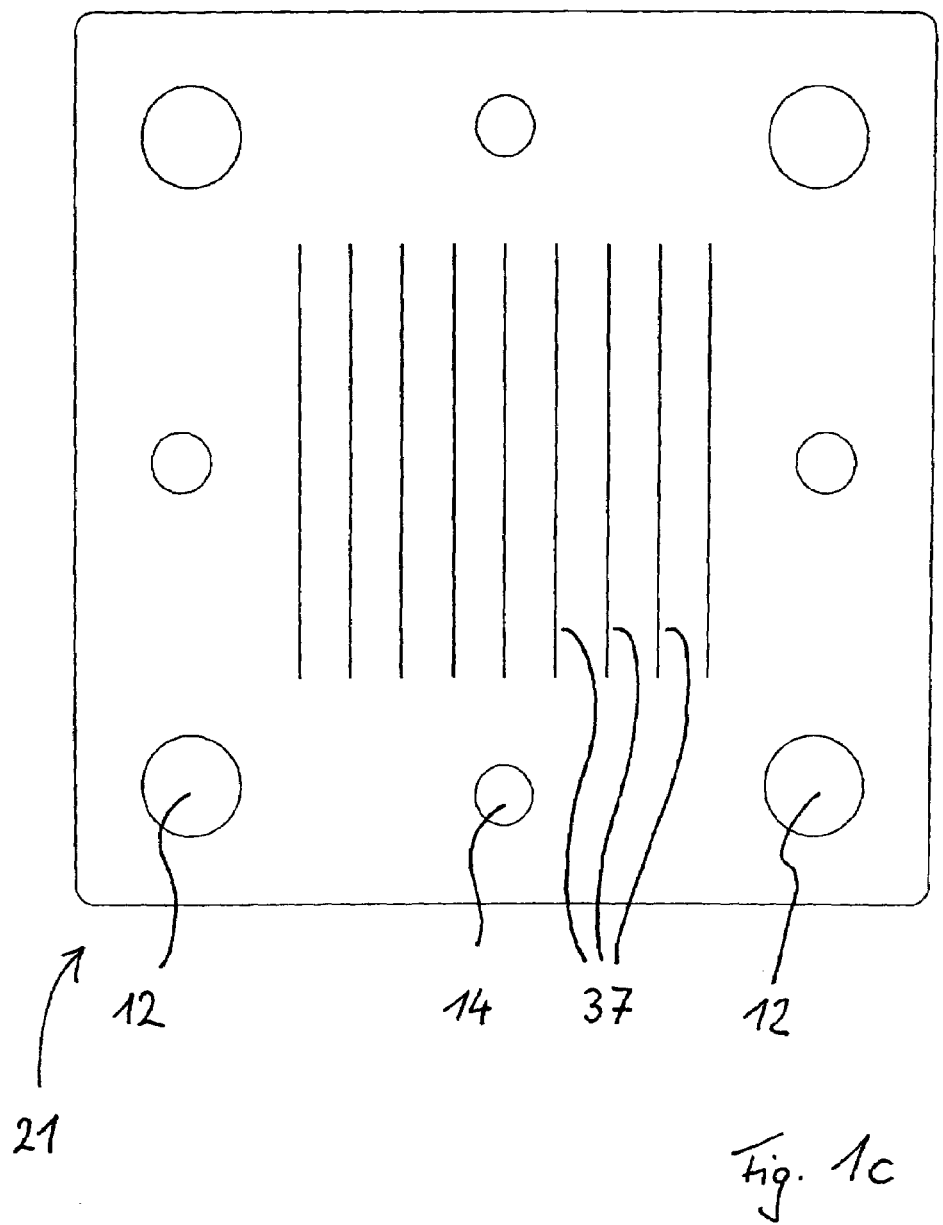
FIG. 1*c* the discharge plate corresponding to the mixing plate in FIG. 1*a*

FIG. 1c shows the discharge plate 21 corresponding to the mixing plate in FIG. 1a. The ports 37 are arranged in a series of parallel curves. The number of ports corresponds to the number of mixing zones in the mixing plate 20 below and the ports are arranged such that they extend perpendicularly to the digital channels and over the entire length of the respective mixing zones 32. Furthermore, the discharge plate 21 also has recesses 14 for bolting the micromixer together as well as penetrations 12 through which the reactants or also the product can flow.

Figure 2:
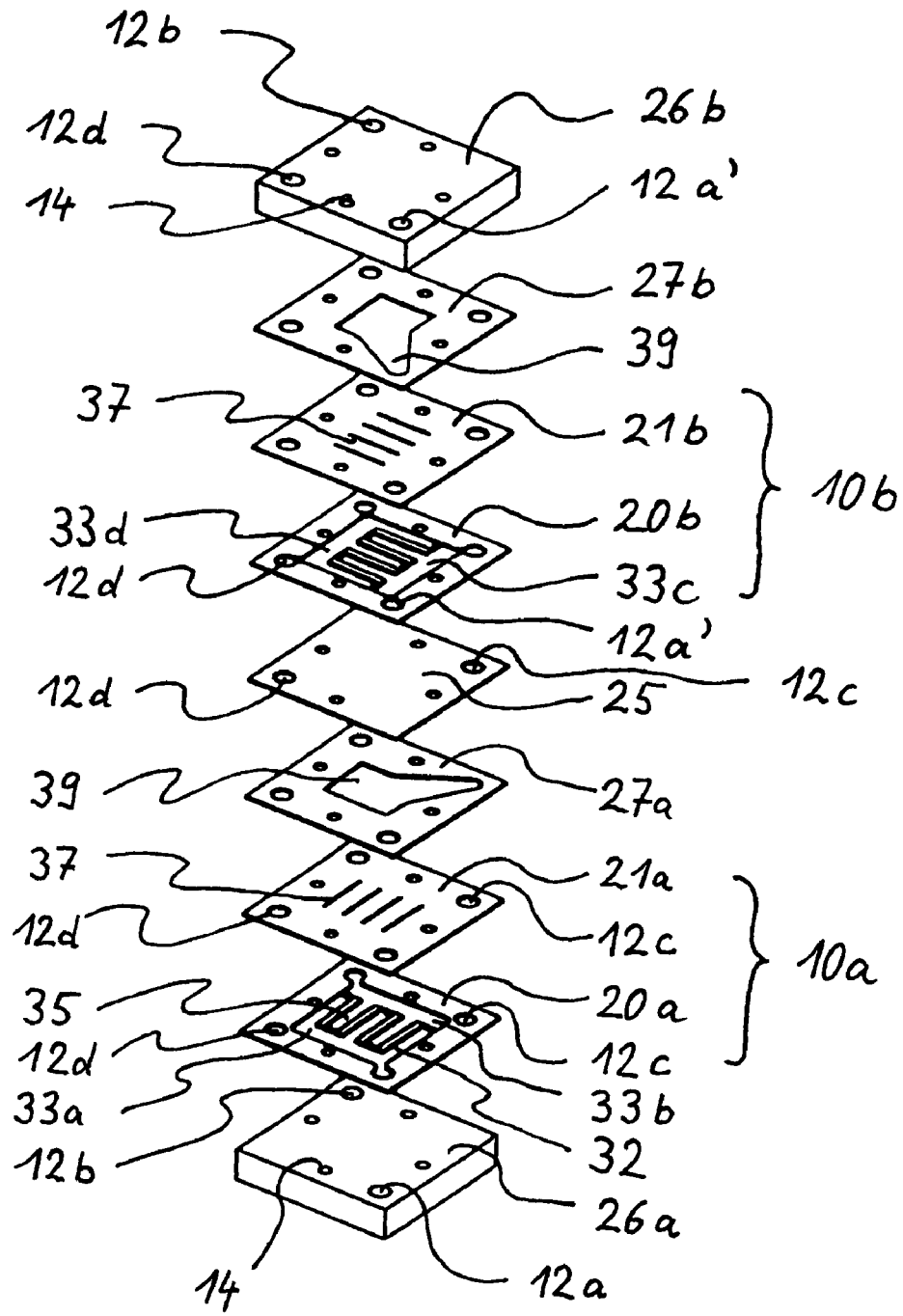
FIG. 2 a mixer system

FIG. 2 shows a mixer system. This mixer system is created by arranging two micromixers per the example in FIGS. 1a–c one above the other. At the bottom is a cover plate 26a with recesses 14 for screws and two penetrations 12a,b through which the reactants A and B are supplied. (Reactant A through the front right penetration 12a and reactant B through the rear left penetration 12b). The direction of flow is from bottom to top.

Above that is a first mixing plate 20a. In addition to the two feeding chambers 33a and 33b, the main channels 35 and the mixing zones 32, the mixing plate 20a has two penetrations 12c,d arranged in two diagonally-opposed corners of the mixing plate 20a. The feeding chambers 33a and 33b are designed such that they are connected to the penetrations 12a,b in the bottom cover plate 26a, through which penetrations the reactants A,B are fed into to the feeding chambers 33a,b.

Above the first mixing plate 20a is a first discharge plate 21a with ports 37. The intermediate product C, which is a product of A and B, is discharged through these ports 37, collected in a collecting chamber 39 formed by plates 27a and 25 arranged above the discharge plate 21a, and directed to the penetration 12c.

The intermediate product C is fed via the intermediate plate 25 into the feeding chamber 33c of the second mixing plate 20b as reactant for the second reaction. Reactant D is fed into the second feeding chamber 33d of the mixing plate 20b via penetrations 12d that form a channel through the front left edge area of the mixer system. Another discharge plate 21b and a collecting plate 27b are arranged above the second mixing plate 20b.

The collecting plate 27b together with the top cover plate 26b forms a collecting chamber 39 for the product of C and D, which is directed to the upper right front penetration 12a' and can exit via the top cover plate 26b.

Reactant D is passed through the front left penetrations 12d; reactant B is passed through the rear left penetrations 12b; the intermediate product C is passed through the rear right penetrations 12c; reactant A is passed through the lower front right penetrations 12a and the end product is passed through the upper right front penetrations 12a'. The intermediate plate 25 forms the boundary between the bottom micromixer 10a and the top micromixer 10b.

Figure 3A:
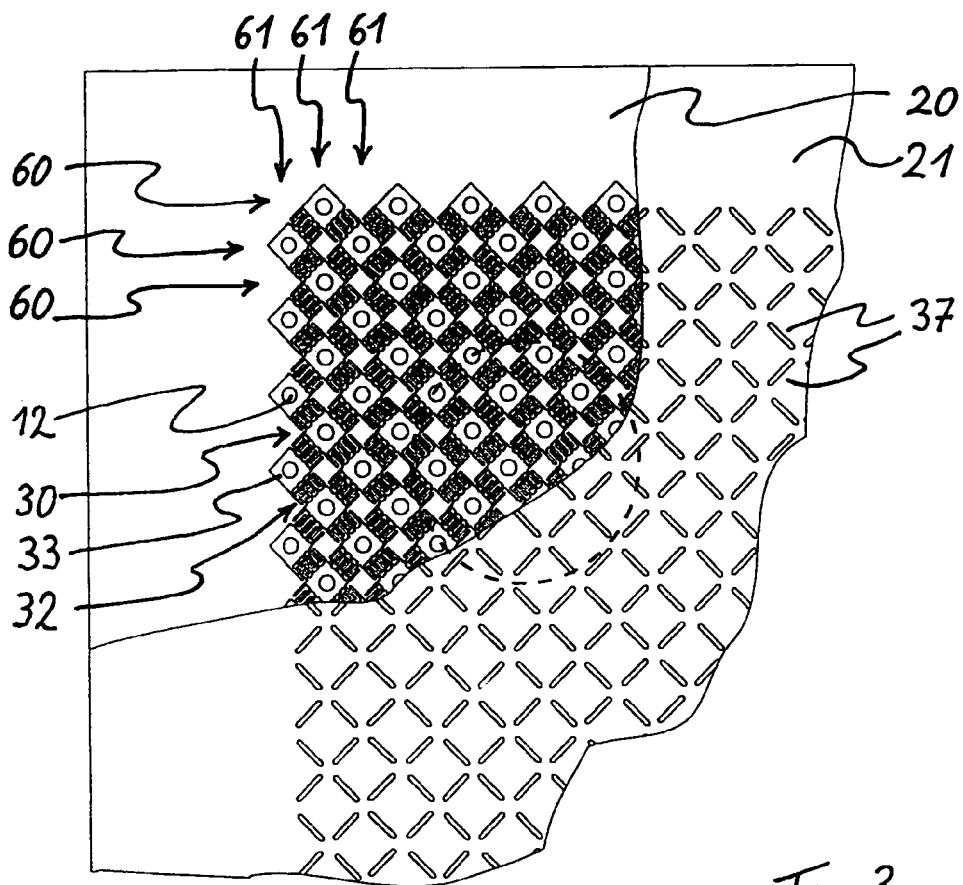
FIG. 3*a* a second embodiment of a mixing plate and an associated discharge plate FIG. 3*b* an area from FIG. 3*a*

FIG. 3a shows an additional embodiment of a mixing plate 20 and the corresponding discharge plate 21. The feeding chambers 33 are square and have mixing zones 32 on each of the four sides. A mixer cell 30 comprises a feeding chamber 33 and four mixing zones 32. Each of the feeding chambers 33 has its own penetration 12 for the supply of a reactant. The feeding chambers 33 are arranged equidistant from one another in rows 60 and columns 61 so that a feeding chamber 33a for one reactant is always surrounded by four feeding chambers 33b for the other reactant. This arrangement of feeding chambers 33 in a regular grid is reflected in the arrangement of the ports 37 in a discharge plate 21 above the mixing plate 20. The ports 37 run along the edges of squares and form a regular box pattern.

Figure 3B:
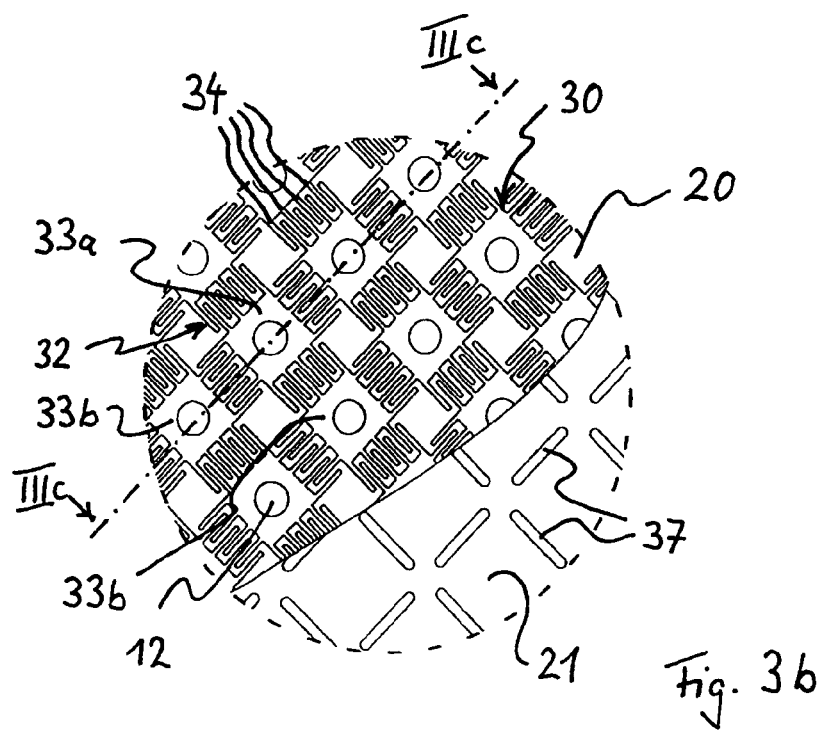
FIG. 3*c* a section through the area in FIG. 3*b* along the line A—A

FIG. 3b shows an enlarged view of that area of FIG. 3a indicated by a broken line. The digital channels 34 that make up the mixing zones 32 can be seen more clearly in this enlarged excerpt.

Figure 3C:
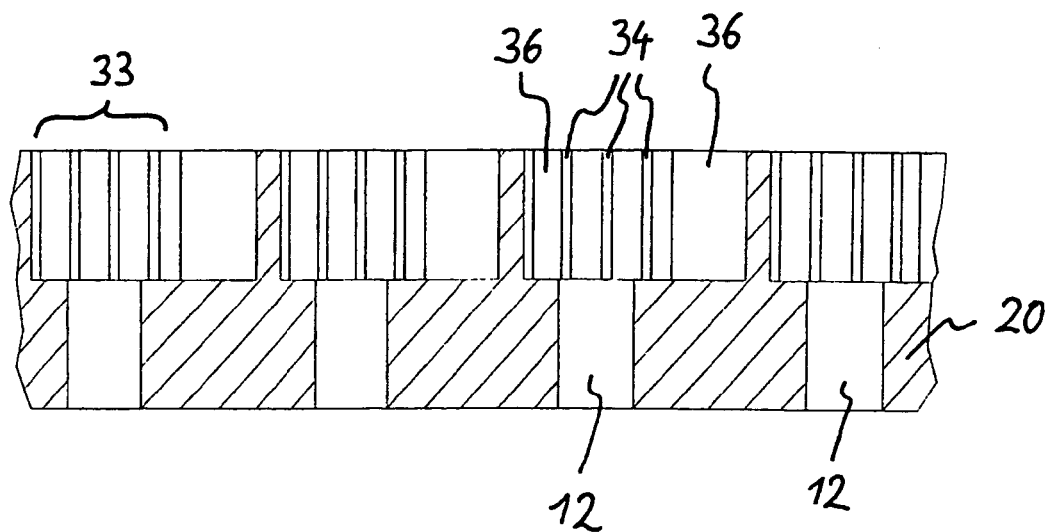

The section through the area shown in FIG. 3b along the line IIIc—IIIc is shown in FIG. 3c. The penetrations 12 through which the reactants are fed into the feeding chambers 33 can be clearly seen here. The digital channels 34 arranged around the feeding chamber and the walls 36 defining these digital channels 34 can also be seen.

The individual digital channels 34 are between 5 and 150 μm wide and the walls 36 defining the digital channels are between 50 μm and 2 mm high. Because of the pressure drop required, the width of the outlet ports 37 is preferably less than the height of the walls 36 defining the digital channels 34. Furthermore, the width of the outlet ports 37 in the discharge plate 21 must be less than the overlap between adjacent digital channels 34 in the mixing zone 32 to achieve complete mixing of the reactants.

Figure 4:
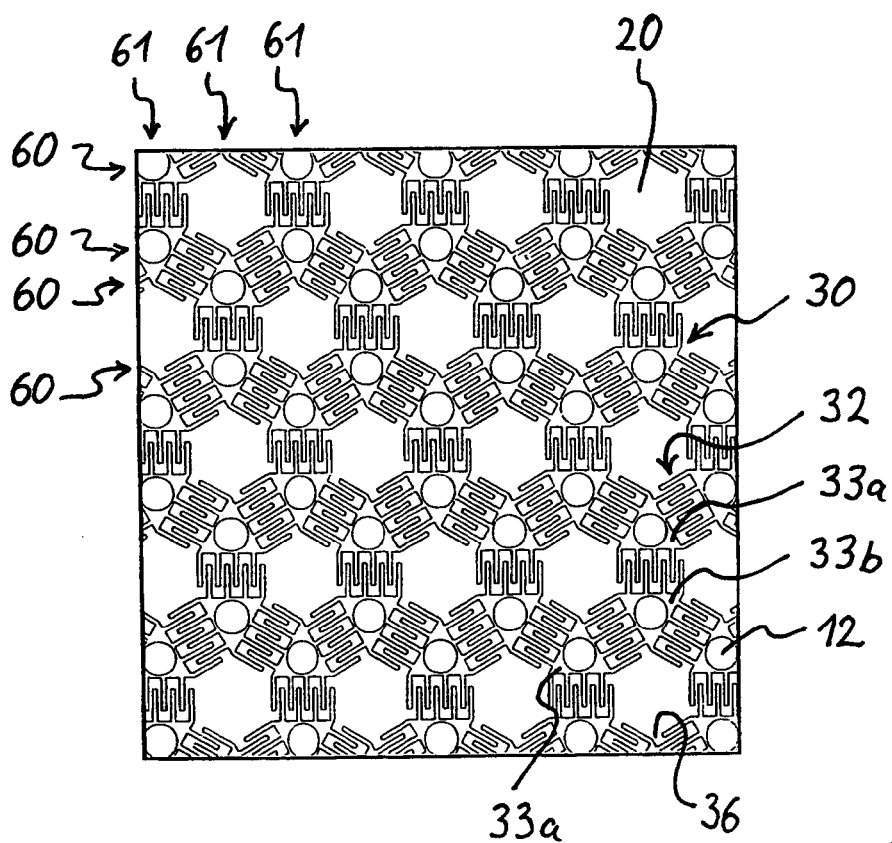
FIG. 4 a third embodiment of a mixing plate

A modification of the embodiment described above is shown in FIG. 4. Here the feeding chambers 33 are triangular with three sides of equal length. Once again there is a mixing zone 32 on all sides of the feeding chamber 33, and the feeding chambers 33 themselves are arranged at the corners of even, adjacent hexagons. The feeding chamber 33a for one reactant is surrounded by three feeding chambers 33b for the other reactant.

Figure 5B:
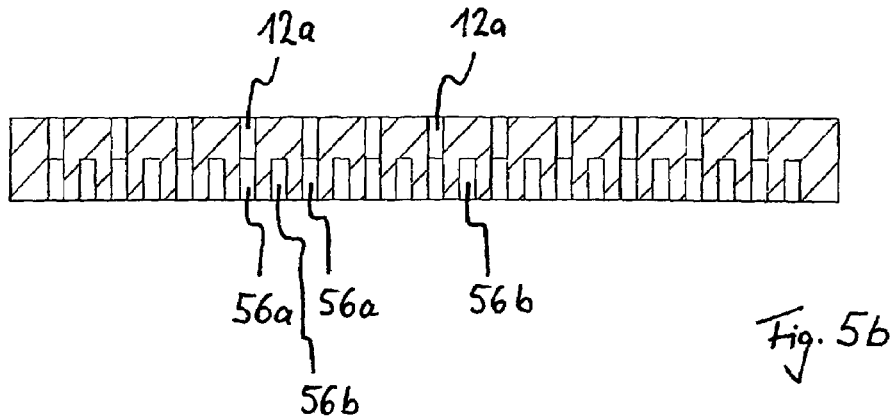
FIG. 5*b* a section through FIG. 5*a* along the line B—B
Figure 5A:
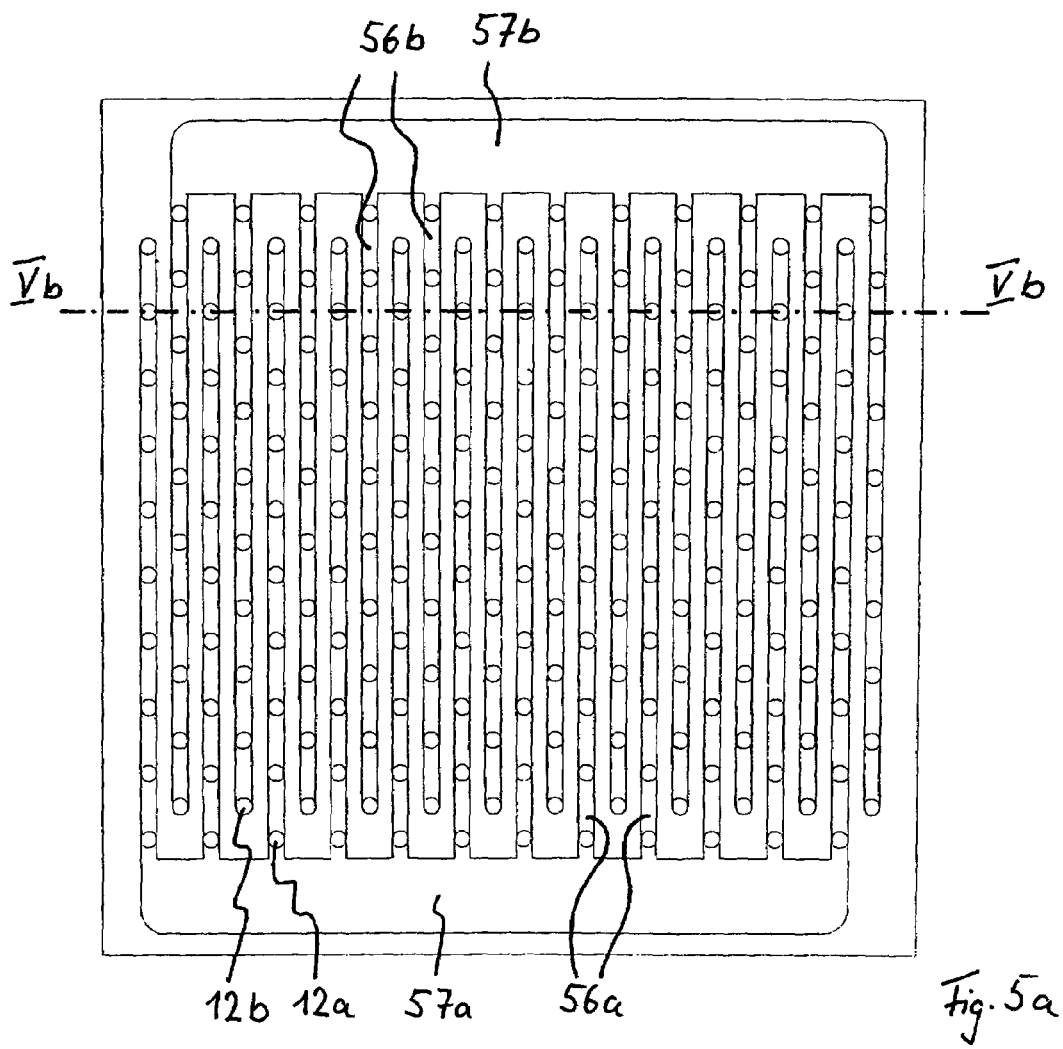
FIG. 5*a* a first embodiment of the reactant supply

FIG. 5a shows a first example for the reactant supply. This is a structured plate attached to the back of the mixing plate, e.g. by means of anodic bonding. A storage chamber 57a for reactant A and a storage chamber 57b for reactant B are found on two opposing sides of the plate. Channels 56a,b lead out from these storage chambers 57a,b. These channels 56a,b, intermesh in a comb-like manner. They run beneath the feeding chamber of the mixing chamber and are parallel to one another. Penetrations 12a,b aligned with corresponding penetrations 12a,b of the mixing plate lead away from each channel 56a,b. The penetrations 12a,b connect the feeding chambers of the mixing plates to the channels 56a,b and thus also to the storage chambers 57a,b. The reactants A,B are supplied to the feeding chambers via this connection. These structures can be produced using deep plasma etching of silicon, for example.

The section along the line Vb—Vb is shown in FIG. 5b. The channels 56a,b are shown again. Only the penetrations 12a can be seen due to the orientation of the section.

Another embodiment of the reactant supply is shown in FIG. 6. All that is shown of the mixing plate 20 are the penetrations 12a,b. Below the mixing plate 20 is the first additional plate 22, below which a second additional plate 23 is arranged. The three plates 20,22,23 are arranged parallel to and at some distance from one another so that a storage chamber 57a for reactant A is formed between the mixing plate 20 and the first additional plate 22, and the first additional plate 22 and the second additional plate 23 form a storage chamber 57b for reactant B. Reactant A is supplied to the feeding chambers of the mixing plate 20 through the penetrations 12a, which directly connect the feeding chambers of the mixing plate 20 and the storage chamber 57a for reactant A. In contrast, reactant B must be passed through the storage chamber 57a. The first additional plate 22 is therefore provided with recesses arranged below the penetrations 12b of the mixing plate 20. Hollow bodies in the form of tubes 58 are passed through the penetrations 12b and the recesses in the first additional plate 22. These tubes 58 form the connection between the storage chamber 47b and the feeding chambers for reactant B.

Figure 7:
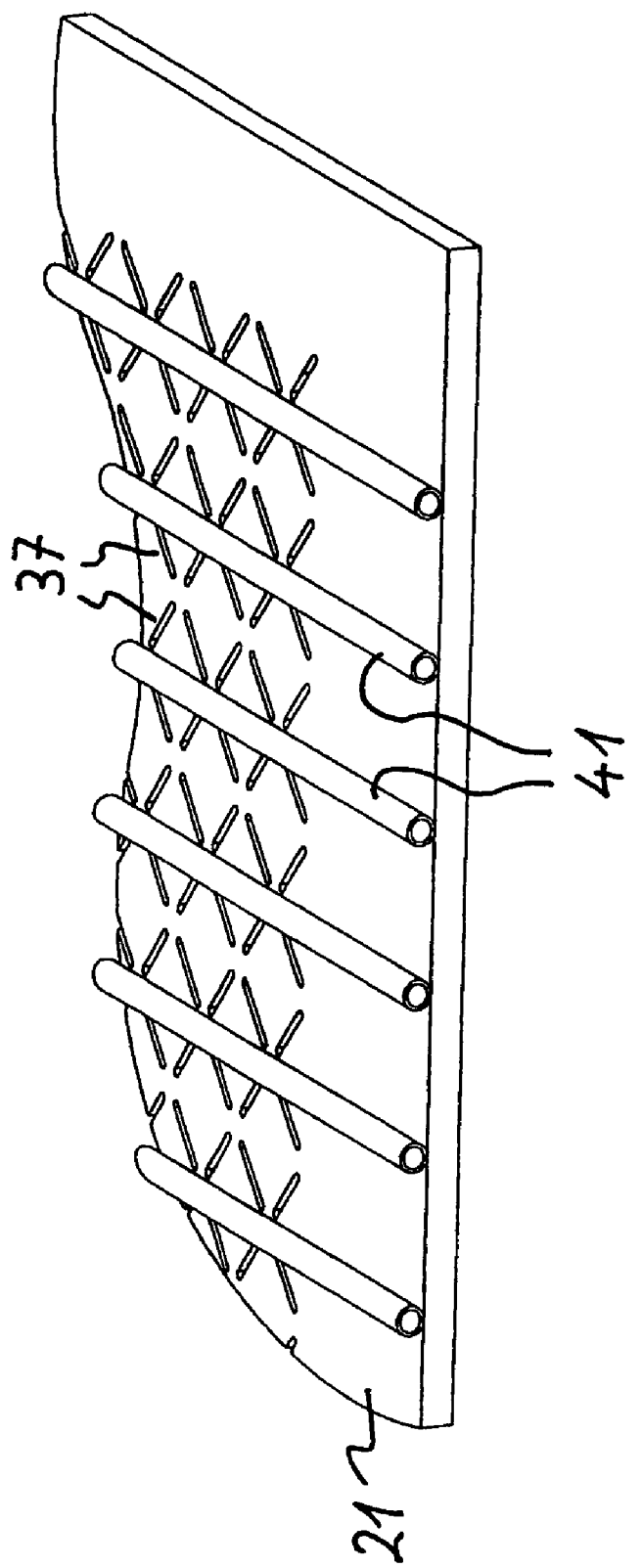
FIG. 7 a first embodiment of an integrated heat exchanger

FIG. 7 shows a first embodiment for the integration of a heat exchanger in the micromixer. In this example, the product is heated or cooled by means of hollow bodies in the form of tubes 41 that are arranged on the discharge plate 21 between the ports 37 and extend over the entire length of the discharge plate 21. A coolant or heating medium is passed through these tubes 41.

Figure 8:
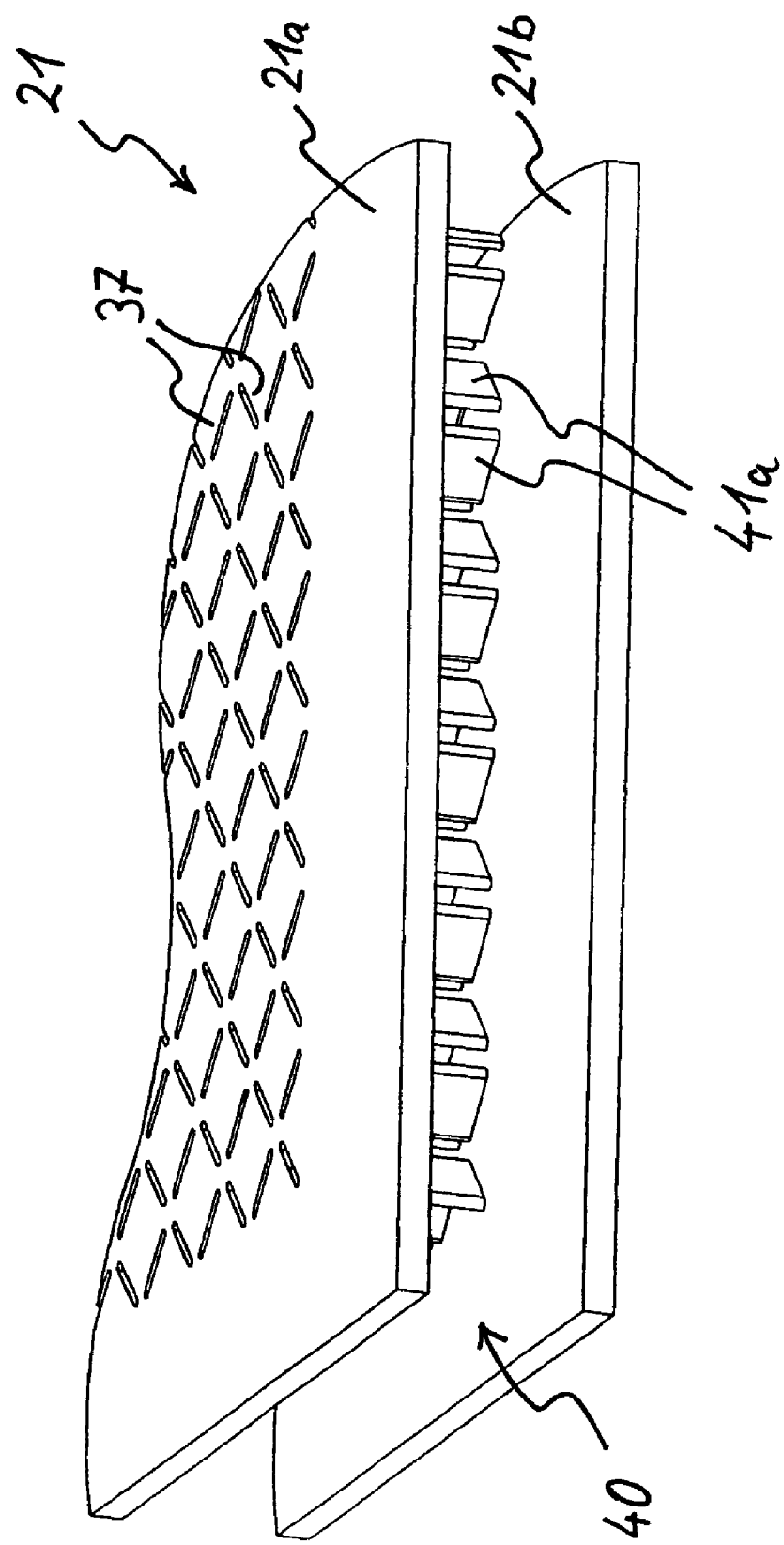
FIG. 8 a second embodiment of an integrated heat exchanger

FIG. 8 shows a second embodiment for the integration of a heat exchanger. In this embodiment, the product is again heated or cooled. The discharge plate comprises two individual plates 21a and 21b. These are arranged parallel to and at some distance from one another to form a chamber 40 for holding a heating medium or coolant. Both individual plates 21a and 21b are provided with discharge ports 37. The product is transported from one side of the cover plate [sic] 21 to the other by means of flattened hollow bodies 41a arranged in the ports to form a connection from one side of the discharge plate 21 to the other.

Figure 9:
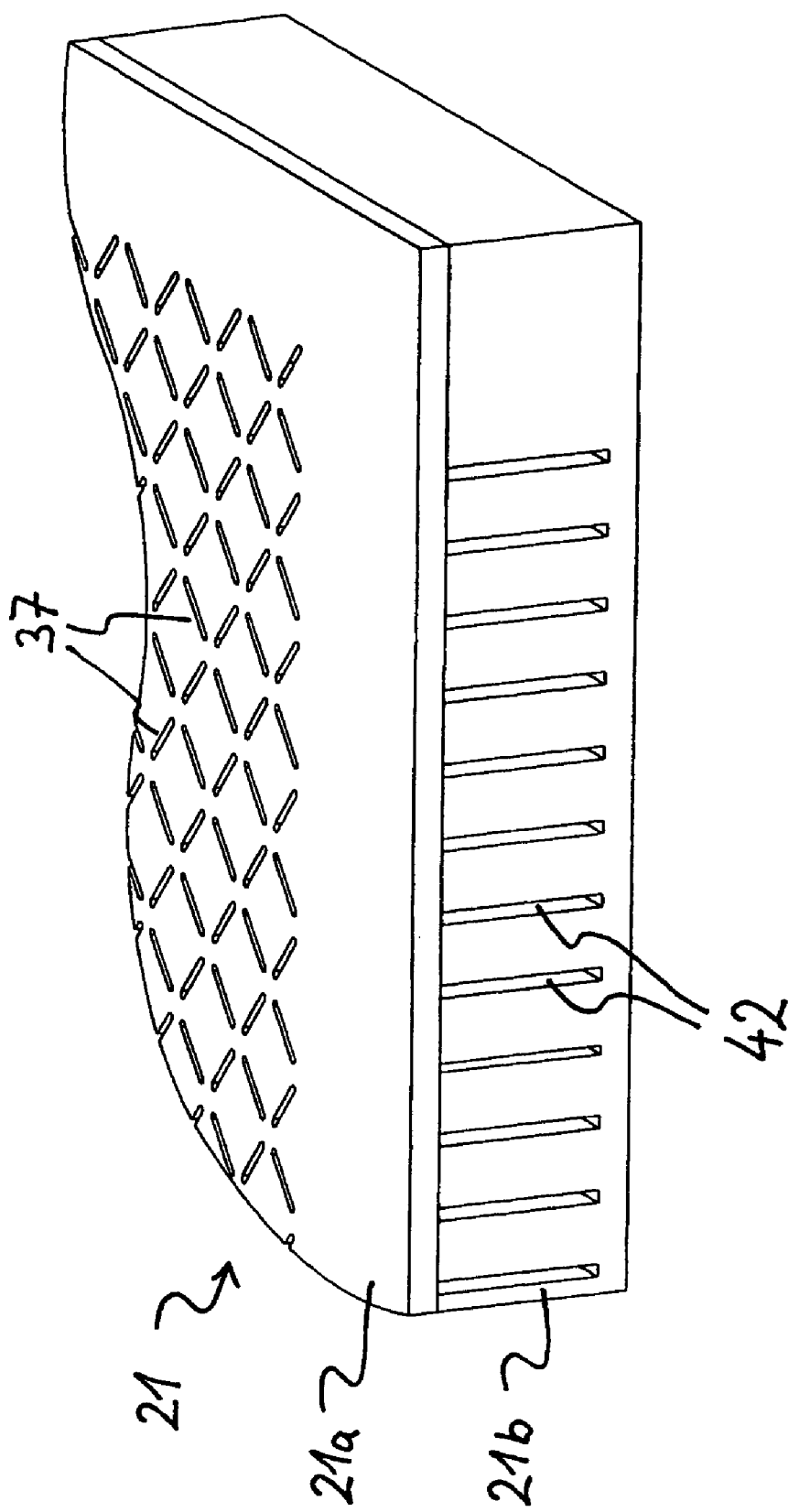
FIG. 9 a third embodiment of an integrated heat exchanger

FIG. 9 shows a third embodiment for heating or cooling the medium. The discharge plate 21 is again a two-piece construction, with an upper slotted plate 21a and a very much thicker lower slotted plate 21b. In addition to the ports 37, the lower, thicker plate 21b also has open-ended slots 42 for holding the coolant or heating medium which extend perpendicular to the ports 37 for the product. It is advantageous if a material with good thermoconducting properties is used for the manufacture of the lower plate 21b.

Figure 10:
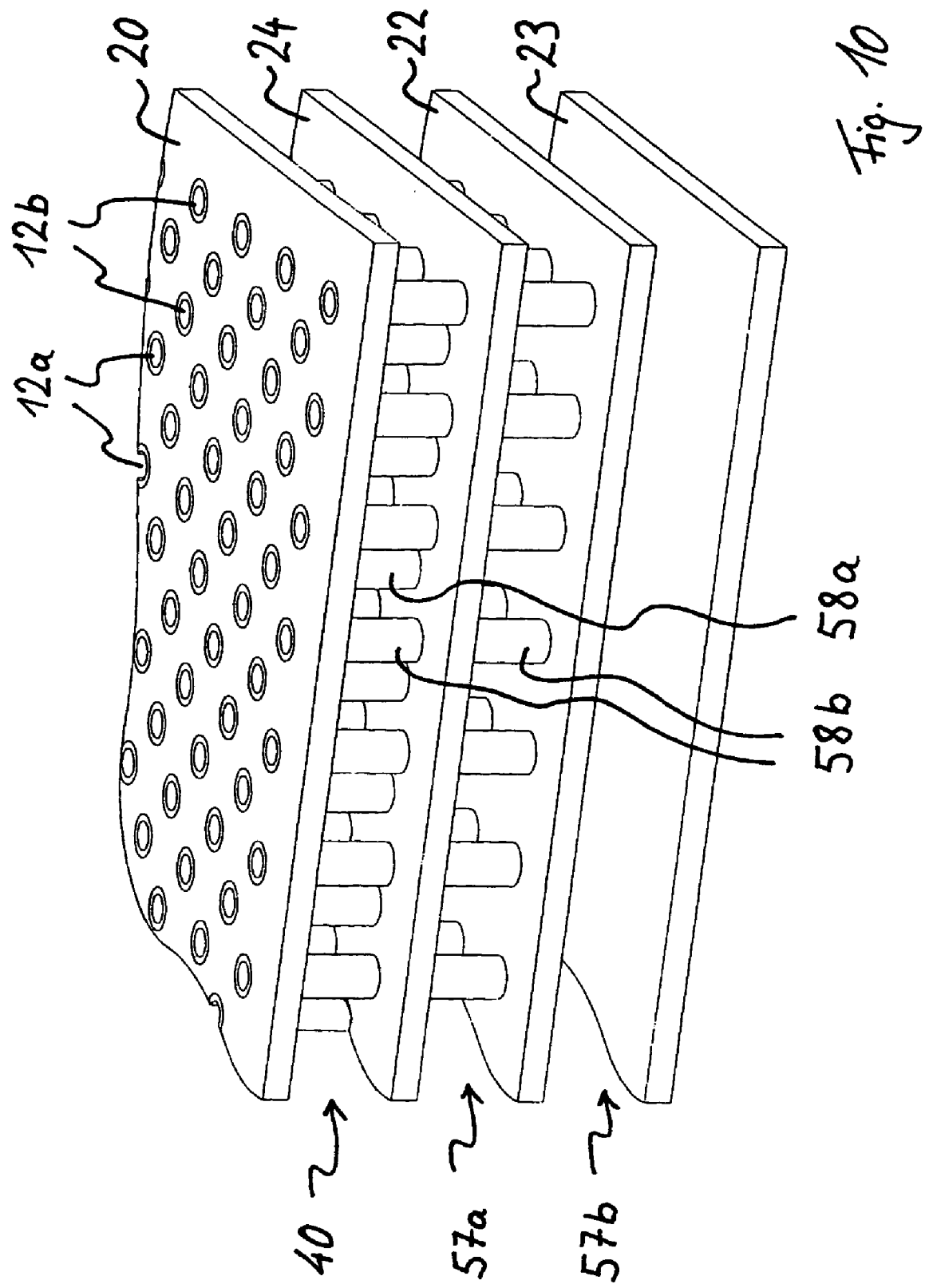
FIG. 10 a fourth embodiment of an integrated heat exchanger

In some cases, it can also be desirable to preheat or cool the reactants. An embodiment enabling this is shown in FIG. 10. This is a micromixer with storage chambers 57a,b for the supply of reactants comprising two additional plates 22, 23. A third additional plate 24 is arranged between the first additional plate 22 and the mixing plate 20. This creates an additional chamber 40 between the mixing plate 20 and the third additional plate 24, in which chamber 40 a heating medium or coolant is found. Because both reactants A and B must be passed through this heat exchanger chamber 40 en route to the feeding chambers 33a,b, in the mixing plate 20, the third additional plate 24 has recesses arranged beneath the penetrations 12a,b of the mixing plate 20. Through these recesses pass hollow bodies in the form of tubes 58a,b which empty into the penetrations 12a,b of the mixing plate 20 and are connected at the other end to either storage chamber 57a or storage chamber 57b. The reactants A,B are evenly attemporated as they pass from the respective storage chamber 57a,b to the feeding chamber 33a,b for the respective reactant A,B.

Figure 11:
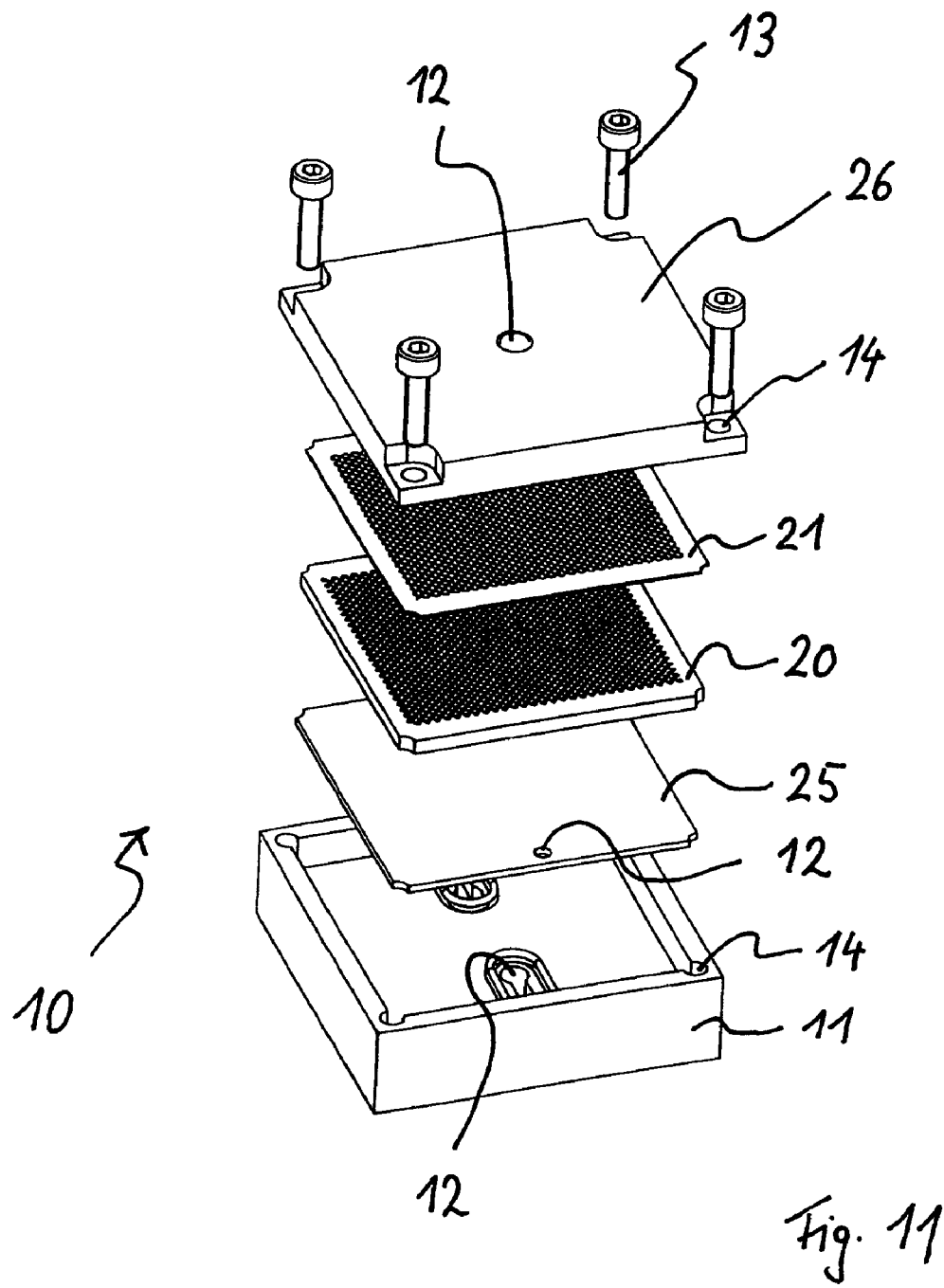
FIG. 11 an exploded view of a micromixer

FIG. 11 is an exploded view of a micromixer. This micromixer 10 comprises a casing 11 having two penetrations 12 for each reactant A,B. The casing 11 also has recesses 14 for seating screws 13. At the bottom of the casing is an intermediate plate 25 with two penetrations 12 for each reactant. A mixing plate 20 structured on both sides is arranged above the intermediate plate 25. The bottom of the mixing plate is provided with microstructures for the supply of the reactants (cf. FIG. 5a). Mixer cells with square feeding chambers are arranged on the top of the mixer plate 20. A slotted discharge plate 21 is arranged above the mixing plate 20. Above the discharge plate is a cover plate 26 having an opening 12 for the product. The cover plate 26 also has recesses 14 for seating screws 13. These screws 13 are used to securely screw the micromixer 10 together.

With a micromixer 10 of this type configured with approximately 1500 feeding chambers per mixing plate, a surface area of 45×45 mm and a volumetric flow of 700 l/h with a pressure drop of approximately 1 bar can be achieved.

REFERENCE NUMBERS 10 micromixer
11 casing
12 penetration
13 screw
14 recess
20 mixing plate
21 discharge plate
22 first additional plate
23 second additional plate
24 third additional plate
25 intermediate plate
26 cover plate
27 collecting plate
30 mixer cell
31 microstructure
32 mixing zone
33 feeding chamber
34 digital channel
35 main channel
36 wall
37 outlet port
39 collecting chamber
40 heat exchanger chamber
41 hollow body
41a flattened hollow body
42 heat exchanger slot
56 channel
57 storage chamber
58 hollow body
60 row
61 column

What is claimed is:

1. A micromixer for mixing at least two reactants having penetrations for the supply of the reactants and/or the discharge of the product comprising: at least one mixing plate with microstructures that define mixer cells, each of said mixer cells having a feeding chamber which adjoins at least one group of digital channels which intermesh in a comb-like manner with the digital channels of a group from the adjoining feeding chambers to form a mixing zone; and a discharge plate arranged on the mixing plate, said discharge plate having an outlet port above each mixing zone, said outlet port extending perpendicularly to the digital channels, wherein each mixer cell has at least two mixing zones.

2. A micromixer as claimed in claim 1, wherein the majority of the feeding chambers have parallel main channels that intermesh in a comb-like manner, with digital channels branching off of said main channels.

3. A micromixer as claimed in claim 1, wherein the majority of the feeding chambers are surrounded on all sides in the plane of the plate by mixing zones.

4. A micromixer as claimed in claim 1, wherein the feeding chambers are arranged according to the reactants in rows and/or columns in an alternating pattern.

5. A micromixer as claimed in claim 3, wherein the feeding chambers have a rectangular outline.

6. A micromixer as claimed in claim 3, wherein the feeding chambers have a triangular outline.

7. A micromixer as claimed in claim 3, wherein that side of the mixing plate facing away from the mixer cells is structured and has two storage chambers for the reactants; has parallel channels which lead away from the storage chambers and run beneath the feeding chambers, whereby the channels for one reactant intermesh in a comb-like manner with the channels for the other reactant; and has penetrations leading from the channels to the feeding chambers.

8. A micromixer as claimed in claim 3, wherein a first plate and below that a second plate are arranged below the mixing plate to form a storage chamber for the two reactants, and said storage chambers are connected via supply lines for the respective reactant to the corresponding feeding chambers, whereby the supply lines for the reactant in the lower storage chamber are hollow bodies which carry the reactant through the upper storage chamber.

9. A micromixer as claimed in claim 3, wherein the micromixer includes an integrated heat exchanger.

10. A micromixer as claimed in claim 9, wherein hollow bodies containing a heating medium or coolant are arranged on the discharge plate between the ports.

11. A micromixer as claimed in claim 9, wherein a heating medium or coolant is passed through the discharge plate.

12. A micromixer as claimed in claim 8, wherein a third chamber for a heating medium or coolant is arranged between the mixing plate and the two storage chambers for reactants, and both reactants are passed in hollow bodies through the third chamber en route to the feeding chambers of the mixing plate.

13. A micromixer array for mixing one or more reactants comprising two or more stacked micromixers as claimed in claim 1.

14. A micromixer array as claimed in claim 13, wherein the micromixers are fluidically connected in parallel.

15. A micromixer array as claimed in claim 13, wherein the micromixers are fluidically connected in serial.

16. A micromixer array as claimed in claim 15, wherein the micromixers for mixing three or more reactants are connected in serial, whereby the first micromixer is designed for mixing two reactants to produce a product, and at least one downstream micromixer is designed to mix the third reactant with the intermediate product.

17. A micromixer array as claimed in claim 13, wherein there are one or more additional plates above, below and/or between adjoining micromixers to supply reactant, collect and/or distribute intermediate products and/or to discharge the product.

* * * * *